US008958345B2

(12) United States Patent
Rath et al.

(10) Patent No.: US 8,958,345 B2
(45) Date of Patent: Feb. 17, 2015

(54) SYSTEM AND METHOD FOR ENHANCING LIFETIME AND THROUGHPUT IN A DISTRIBUTED WIRELESS NETWORK

(71) Applicant: Tata Consultancy Services Limited, Mumbai (IN)

(72) Inventors: Hemant Kumar Rath, Bangalore (IN); Rajan Mindigal Alasingara Bhattachar, Bangalore (IN); Anantha Simha, Bangalore (IN); Balamuralidhar Purushothaman, Bangalore (IN)

(73) Assignee: Tata Consultancy Services Limited, Mumbai (IN)

( * ) Notice: Subject to any disclaimer, the term of this patent is extended or adjusted under 35 U.S.C. 154(b) by 119 days.

(21) Appl. No.: 13/849,803

(22) Filed: Mar. 25, 2013

(65) Prior Publication Data
US 2013/0250812 A1 Sep. 26, 2013

(30) Foreign Application Priority Data
Mar. 26, 2012 (IN) .......................... 809/MUM/2012

(51) Int. Cl.
*H04L 12/28* (2006.01)
*H04W 24/02* (2009.01)
*H04W 40/10* (2009.01)

(52) U.S. Cl.
CPC .............. *H04W 24/02* (2013.01); *H04W 40/10* (2013.01)
USPC ............ 370/255; 370/400; 370/401; 370/338

(58) Field of Classification Search
None
See application file for complete search history.

(56) References Cited

U.S. PATENT DOCUMENTS

| | | | |
|---|---|---|---|
| 6,414,955 B1 * | 7/2002 | Clare et al. ................... | 370/390 |
| 7,593,342 B2 | 9/2009 | Molisch et al. | |
| 7,668,127 B2 | 2/2010 | Krishnamurthy et al. | |
| 7,782,872 B2 | 8/2010 | Rinne | |
| 2002/0044533 A1 * | 4/2002 | Bahl et al. ..................... | 370/255 |
| 2002/0118661 A1 | 8/2002 | Voce | |
| 2007/0099678 A1 * | 5/2007 | Kim et al. ..................... | 455/574 |

OTHER PUBLICATIONS

Rahul Mangharam, Anthony Rowe and Raj Rajkumar, "Firefly: A Cross-Layer Platform for Real-Time Sensor Networks" Department of Electrical & Computer Engineering, Carnegie Mellon University, Pittsburgh, PA, pp. 1-40.

(Continued)

*Primary Examiner* — Duc C Ho
(74) *Attorney, Agent, or Firm* — Finnegan, Henderson, Farabow, Garrett & Dunner LLP (57) ABSTRACT

A system and method for enhancing lifetime and throughput in a distributed wireless network is disclosed herein. The method may include sensing, by a first machine, different parameters of at least one neighboring machine; updating, by the first machine, at least one parameter of said first machine based on said sensed parameters of said neighboring machine; generating, by the first machine, a signed-graph on the basis of the updated parameter, wherein said generated graph comprises at least two nodes representing said updated parameter and at least one edge interconnecting said two nodes; iteratively updating, by the first machine, the at least one parameter at different time-scales until convergence is achieved; and communicating, by the first machine, inter-layer updates in individual layers of a transmission protocol stack of the first machine due to said update of at least one parameter.

15 Claims, 8 Drawing Sheets

(56) References Cited

OTHER PUBLICATIONS

Yannis Paschalidis and Christos Cassandras, "Distributed Wireless Sensor Networks for Long-term Deployments" Boston University (1 page).

Tommaso Melodia, Mehmet C. Vuran, and Dario Pompili, "The State of the Art in Cross-Layer Design for Wireless Sensor Networks" Wireless Syst./Network Architect. 2005, LNCS 3883, pp. 78-92, 2006.

Luigi Iannone and Serge Fdida, "MRS: A Simple Cross-Layer Heuristic to Improve Throughput Capacity in Wireless Mesh Networks," CoNEXT'05, Oct. 24-27, 2005, Toulouse, France (10 pages).

Ozlem Durmaz Incel, Amitabha Ghosh and Bhaskar Krishnamachari, "Scheduling Algorithms for Tree-Based Data Collection in Wireless Sensor Networks," Theoretical Aspects of Distributed Computing in Sensor Networks Monographs in Theoretical Computer Science. An EATCS Series 2011, pp. 407-445.

Jennifer Yick, Biswanath Mukherjee, and Dipak Ghosal, "Wireless sensor network survey," Science Direct, Computer Networks 52 (2008), pp. 2292-2330.

Cheng, M.X., Xuan Gong, Lin Cai, Xiaohua Jia, "Cross-Layer Throughput Optimization With Power Control in Sensor Networks," IEEE Transactions on Vehicular Technology, Sep. 2011, pp. 3300-3308, vol. 60, No. 7.

European Search Report dated Jul. 17, 2014 in corresponding European Application No. 13158299.1 (7 pages).

Balamuralidhar, P. et al., "Self-Configuration and Optimization for Cognitive Networked Device," *Wireless Pers Commn,* 59:471-486 (Feb. 2011).

Rath, Hemant Kumar et al., "Monotonic Signed Graph Approach for Cross-Layer Congestion Control in Wireless Ad-hoc Networks," $6_{th}$ IEEE *International Workshop on Heterogeneous, Multi-Hop, Wireless and Mobile Networks,* pp. 309-314 (Dec. 2011).

Rath, Hemant Kumar et al., "Weighted Signed Graph (WSG) Power-Aware Routing in Distributed Wireless Networks," *GC'12 Workshop: the 7th IEEE International Workshop on Heterogeneous, Multi-Hop, Wireless and Mobile Networks,* pp. 475-480 (Dec. 2012).

* cited by examiner

SYSTEM AND METHOD FOR ENHANCING LIFETIME AND THROUGHPUT IN A DISTRIBUTED WIRELESS NETWORK

CROSS-REFERENCE TO RELATED PATENT APPLICATION

The present application claims priority under 35 U.S.C. §119 to Indian Patent Application No. 809/MUM/2012, filed Mar. 26, 2012. The aforementioned application is incorporated herein by reference in its entirety.

TECHNICAL FIELD

Exemplary embodiments of the present disclosure generally relate to the field of signal processing and optimization in distributed wireless networking. More particularly, they relate to a system and method for enhancing lifetime and throughput of a distributed wireless network by self-optimization of the network.

BACKGROUND

With the advent of digital communication, wireless networks have been effectively adopted worldwide for facilitating various networking applications. For example, wireless communication has become the de-facto communication medium at homes, work locations, malls, airports, stadiums, colleges, and other necessary mediums. Further, due to gradual growth in miniaturization technology, dimensions of battery operated handheld devices, or more specifically, the nodes in general of a wireless network have been drastically reduced in order to serve variety of applications by means of these handheld devices.

In general, to execute the applications by means of wireless communication these nodes require high rate of transmission. Additionally, these nodes need to support long periods of use between battery charges. Thus, the lifetime of the nodes becomes crucial and therefore these nodes require enhanced lifetime and higher rate of communication. In order to facilitate the higher transmission rate and enhance the lifetime of the wireless network, optimal techniques are required.

In the present scenario, maximization of lifetime and throughput requires frequent exchange of control messages between nodes. However, since wireless networks are broadcasting networks, such control message exchanges not only reduce the effective rate of transmission between nodes, but also impact the overall lifetime of the nodes. This is because wireless nodes are mainly battery powered and processing of a packet/frame or message for transmission or reception requires energy consumption. Therefore, while optimal techniques are important, they also consume resources in terms of battery and throughput.

Wireless networks in general are of two types: centralized network and distributed network. In a centralized network, each wireless node communicates with a central node or base station for usual communication. However, in a distributed network, each wireless node communicates with other nodes or its neighbors for computing, communication, storage and other services in a distributed fashion. Therefore, in order to transmit at its optimal rate each node requires control messages to communicate with its neighboring node. Since the wireless network is broadcasting in nature, inter node communications not only hamper the effective rate or throughput of the network, but also reduce the lifetime of the network. In addition to this, the complexity of communication protocols and computation also reduces the lifetime of the network.

More specifically, the optimization techniques used in the background require message passing between the individual nodes. In other terms, each node requires adequate information regarding the power available in the neighboring nodes, interference in other nodes, and maximum capacity, etc. Further, in order to share this information with the nodes, it is evident that more resources in terms of battery power and throughput are required. Finding an optimal solution for the above problem in real time is very difficult and often ends up with an iterated solution. Therefore, it demands more computing power. Thus, as these methods consume more battery power, hence they may not be feasible for optimization of the wireless networks.

Thus, the existing practices of achieving enhancement in lifetime and throughput are complex and difficult to implement. Most of the existing approaches require message passing which is resource consuming and hence are non-scalable. Further, in the existing optimal approaches, each node requires detailed information about the other nodes in the network. Such detail information includes placement of each node in the network, power available, detailed QoS requirement, etc.

Therefore, in view of the above, there is a long-felt need in the art for a method and system that enables enhancement of lifetime and throughput of wireless network that is scalable, resource-saving, less complex and easy to deploy at each node. More specifically, there is a need for a method and system that avoids passing of control messages amongst the individual nodes in the network and thereby facilitates the self-optimization of the network.

SUMMARY

Before the present methods, systems, and hardware enablement are described, it is to be understood that the disclosure is not limited to the particular systems, and methodologies described, as there can be multiple possible embodiments of the present disclosure which are not expressly illustrated in the present disclosure. It is also to be understood that the terminology used in the description is for the purpose of describing the particular versions or embodiments only, and is not intended to limit the scope of the present disclosure.

An embodiment may provide a system and method for enhancing lifetime and throughput in a distributed wireless network is disclosed herein. The method may include sensing, by a first machine, different parameters of at least one neighboring machine; updating, by the first machine, at least one parameter of said first machine based on said sensed parameters of said neighboring machine; generating, by the first machine, a signed-graph on the basis of the updated parameter, wherein said generated graph comprises at least two nodes representing said updated parameter and at least one edge interconnecting said two nodes; iteratively updating, by the first machine, the at least one parameter at different time-scales until convergence is achieved; and communicating, by the first machine, inter-layer updates in individual layers of a transmission protocol stack of the first machine due to said update of at least one parameter.

A system may be provided that implements the above exemplary method.

BRIEF DESCRIPTION OF DRAWINGS

The foregoing summary, as well as the following detailed description of embodiments, is better understood when read in conjunction with the appended drawings. For the purpose of illustrating the disclosure, there is shown in the drawings exemplary constructions of the embodiments of the disclosure; however, the disclosure is not limited to the specific methods and architecture disclosed in the drawings:

FIGS. 2 (a) and 2(b) illustrates posing of resource allocation problem as a multi-time scale allocation problem solved by implementing a signed graph based self-optimization according to an exemplary embodiment of the disclosure.

DETAILED DESCRIPTION

Some embodiments of this disclosure, illustrating all its features, will now be discussed in detail. The words "comprising," "having," "containing," and "including," and other forms thereof, are intended to be equivalent in meaning and be open ended in that an item or items following any one of these words is not meant to be an exhaustive listing of such item or items, or meant to be limited to only the listed item or items. It must also be noted that as used herein and in the appended claims, the singular forms "a," "an," and "the" include plural references unless the context clearly dictates otherwise. Although any systems and methods similar or equivalent to those described herein can be used in the practice or testing of embodiments of the present disclosure, the exemplary, systems and methods are now described. The disclosed embodiments are merely exemplary of the disclosure, which may be embodied in various forms.

Various modifications to the embodiment will be readily apparent to those skilled in the art and the generic principles herein may be applied to other embodiments. For example, although the present disclosure will be described in the context of a system and method for estimating efforts in an application outsourcing, one of ordinary skill in the art will readily recognize that the method and system can be utilized in any situation where a customer is impelled to estimate the efforts in terms of monetary value, resources utilized, hours shelled out for support services etc. Thus, the present disclosure is not intended to be limited to the embodiments illustrated, but is to be accorded the widest scope consistent with the principles and features described herein. Various embodiments of the present disclosure will now be described with the help of appended figures.

Embodiments of present disclosure propose how to pose a resource allocation problem in the wireless networks as a multi-time scale allocation problem. Further, the embodiments propose how to model the multi-time scale allocation problem as a signed-graph problem. Therefore, the first step in achieving self-optimization may be to identify a resource allocation problem in the network and pose the identified problem as a multi-time scale allocation problem that can be solved by implementing signed-graph technique.

Figure 1:
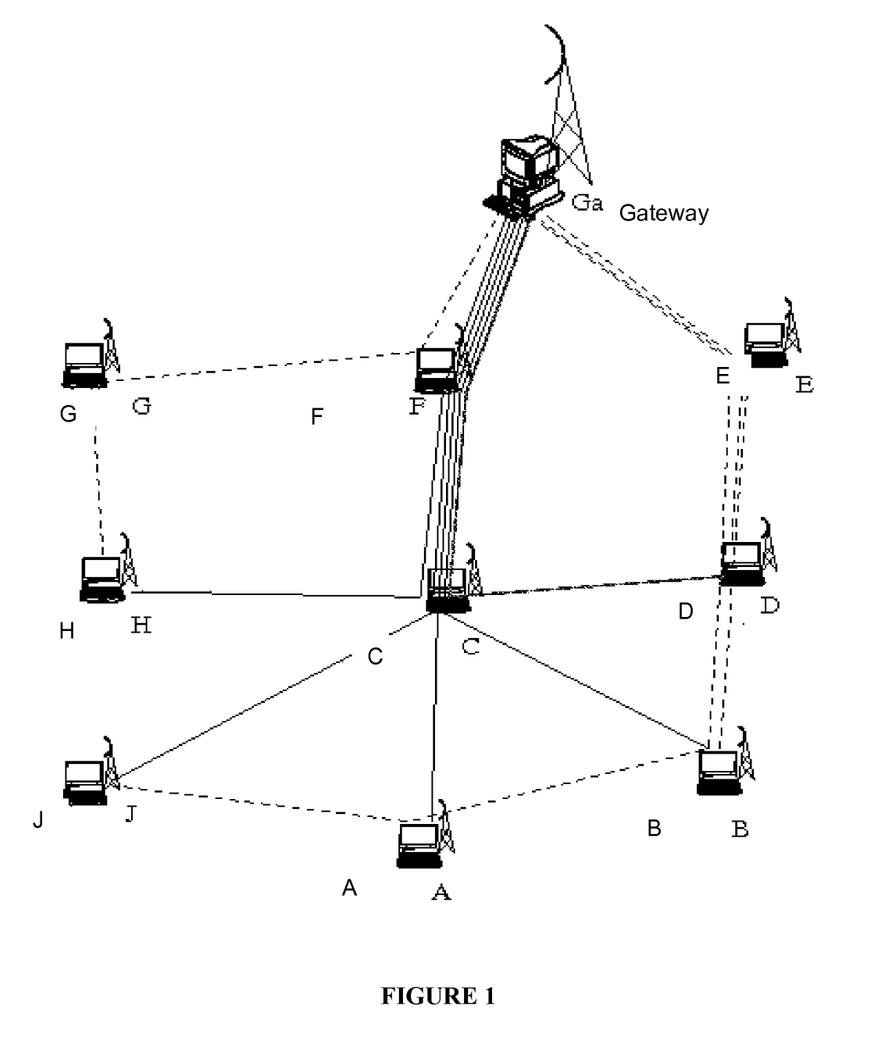
FIG. 1 is a distributed wireless network (100) illustrating a resource allocation problem among individual nodes in the network according to an exemplary embodiment of the disclosure.

FIG. 1 is a distributed wireless network (100) illustrating a resource allocation problem among individual nodes in the network according to an exemplary embodiment of the disclosure. As illustrated in FIG. 1, the distributed wireless network may include both wireless ad-hoc networks and wireless sensor networks. The individual nodes may be placed in a distributed manner and each node of the network may transmit packets to the gateway. As shown in the FIG. 1, multiple paths may exist between the source node and the gateway. In an exemplary embodiment, each of the wireless nodes may be battery powered having a specific maximum power value ($P_{Max}$), and may be capable of transmitting at a variable power.

Referring to FIG. 1, in an exemplary embodiment, each of the nodes may be capable of choosing a suitable modulation scheme for transmission. Further, according to the present disclosure, there may exist reciprocity in the wireless channel, i.e. the wireless channel between individual nodes may be identical in both directions. Further, the model proposed may consider log-normal fading and path-loss due to distance. However, in an alternative embodiment, multipath loss model like Rayleigh loss model also may be incorporated in formulation without any loss of generality.

In this exemplary embodiment, each node may execute various network applications which generate packets. The nodes while transmitting their own data may be also configured to relay the data of other nodes in the network. More specifically, the nodes may not distinguish between self generated data and forwarding data packets. Further, each node may be capable of finding its optimal shortest path route to reach a destination node. The applications running at different nodes may require Quality of Services (QoS) in terms of maximum/average delay, minimum/average throughput, etc. The applications in turn may use TCP or UDP as the Transport layer protocol. With TCP as the transport layer protocol, the transmission may be controlled end-to-end. Apart from this, TCP may also employ congestion control/avoidance protocols to control the rate of transmission. TCP may update its rate of transmission using an Adaptive Window Management technique by changing the congestion window (cwnd) of a flow; increase with every successful reception of acknowledgement and decrease with every timeouts and multiple duplicate acknowledgements—dupacks (triple Dupacks). In TCP, guarantee of reception may be more important than delay in reception. UDP, unlike TCP may not control the rate of transmission. Instead, the applications using UDP may require hard end-to-end delay bound, failing which the packets may get dropped. To provide delay guarantee in-terms of average/maximum delay, an average throughput at the Transport layer may need to be maintained. Since Transport protocols operate on end-to-end mechanism, changes in parameters such as average delay/maximum delay, cwnd size etc., may get reflected only after one Round Trip Time (RTT).

In an exemplary embodiment, unlike transport layer, network layer may not operate on an end-to-end basis. However, routing table generation and updating may require global information (or a cached version of previous global information) for route computation and hence frequent changes of route at a node may be a costly affair. In practice, the time duration of change of route at a node may depend not only on the state of the concerned node (in wireless networks the battery availability at node and the link capacity associated with the link), but may also depend on the state of other nodes. However, to provide transparent end-to-end services at the transport layer, period of route computation may be more than the updating period of transport layer. In other words, route change may not be triggered before one RTT and so on. This may not only provide transparent services to transport layer protocols, but also save battery power at a node level and hence the lifetime of the network. Similar to network layer and transport layer updates, MAC as well as PHY layer may also update their power transmission, modulation index at an appropriate time scale such that the effect of interference, channel condition, etc., are mitigated.

In an exemplary embodiment, as illustrated in FIG. 1, there may be multiple paths available between nodes; however, a bottleneck may arise between flows while selecting a particular path. For example, as illustrated in FIG. 1, bypassing the central node "C" may lead to select a longer path viz. J-A-B-E-D-Gateway instead of J-C-F-Gateway. Thus, resource allocation may become a problem and hence needs to be mitigated by enabling self-optimization.

In an exemplary embodiment, considering the wireless network illustrated in FIG. 1, let $x_i$ (t) be the instantaneous transmission rate of node at time t, where I is the set of nodes. Each node may attempt to maximize its instantaneous rate. Let $R_i$ (t) be the routing matrix associated with node i at time t. According to this exemplary embodiment, consider $y_i$ (t) defined as the corresponding rate of transmission at Transport Layer, which may be either the congestion window size (cwnd) for TCP or average rate of transmission for UDP. Let $b_i$ (t) be the battery power available at time t in node i; $b_i$ (t)$_{Max}$=$P_{MAX}$. Let $p_i$ (t) and $m_i$ (t) be the transmission power and modulation index of node 'i' at time t respectively. Consider lifetime of node 'i' defined as $z_i$ (t) representing the duration for which the node can actively participate in the network: transmit-receive-sense etc. Let $I_i$(t) and $IO_j$(t) be the inference observed at node i and node j respectively at time t. In wireless networks, increase in transmission power at any node i may result in increase of interference in other neighboring node j. In this exemplary embodiment, though the parameters such as instantaneous transmission rate, routing index, battery availability, transmission power, transport layer rate, etc., are time indexed (at different time scales), they are not referenced with time index t. According to an exemplary embodiment, the optimization problem posed and needed to be solved to allocate various resources referring the equation (1) may be set forth as below:

$$\max U_i(x_i) - q_i x_i$$

$$\max z_i$$

$$s.t., P_{Min} \leq P_i \leq P_{Max}, t_{di} \leq t_{dth} \quad (1)$$

where $U_i$ ($x_i$) may be the utility associated with $x_i$, $q_i$ may be the cost associated with the transmission of $x_i$ and $z_i$ may be the lifetime associated with the node i. The $t_{di}$ and $t_{dth}$ may be the current delay associated with the transmission of HoL (Head of Line) packet of node i and $t_{dth}$ may be the maximum delay tolerable by the application at node i respectively (real time packets may be dropped if the delay condition is violated). The shape/nature of the utility function $U_i(x_i)$ may depend upon the transport layer protocols used and application requirements. For example, it may be observed that $U_i(x_i)$ is convex and double differentiable for TCP, whereas it may not be convex and double differentiable in the case of UDP. UDP can be modeled using approximation techniques. In that case the solution obtained from (1) may not be unique.

The term cost $q_i$ may be similar to packet drops in wired/wireless network due to buffer overflow or due to packet error. It may also include the battery consumption due to transmission or relaying. Cost due to battery consumption may increase as the node reduces its battery power. Therefore, to increase lifetime, nodes should minimize the transmission. With these observations, it may be apparent that the objective functions presented in equation (1) are conflicting in nature; the first maximization (utility) results in higher transmission rate whereas the second maximization (lifetime) results in reducing its transmission rate.

Therefore, an exemplary embodiment may enable a self-optimization of each node in the network and thereby facilitate the optimization of the entire network. The embodiment may pose the optimization problem observed in equation (1) at different time instances and modeled as multi-time scale signed-graph problem. Each node of the network may be adapted to solve equation (1) to obtain optimal solution in-terms of transmission power, modulation index, route and transmission rate, etc. More particularly, each node in the wireless network (100) as illustrated in FIG. 1 may attempt to obtain the optimal transmission power, modulation index, route and transmission rate to solve the equation (1). In this exemplary embodiment, each node may sense its neighboring information such as interference, routing table (from periodic broadcasts), and congestion through packet acknowledgements etc., thereby obtaining the optimal transmission power and transmission rate using self-optimization. Therefore, each individual node may be configured to sense the data from the neighboring nodes using self-learning mechanism and hence may not require message passing thereby enabling power saving and increasing lifetime of each node in the network.

Figure 2:
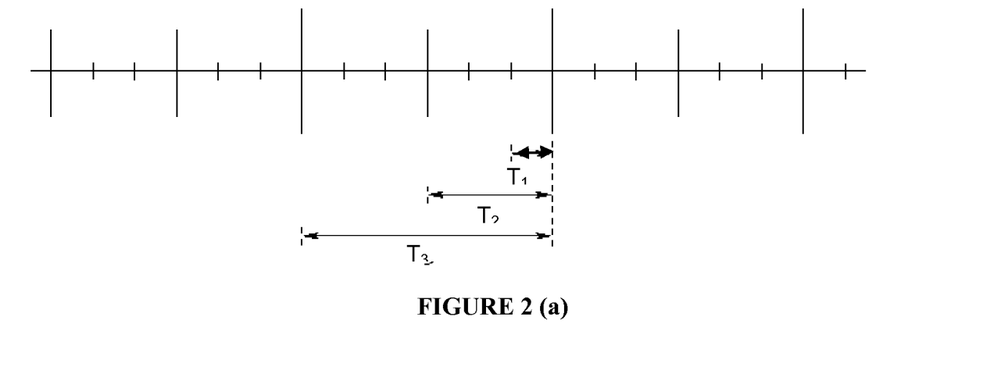

FIGS. 2 (a) and 2(b) illustrate posing of the resource allocation problem or an optimization problem as a multi-time scale allocation problem solved by implementing a signed-graph based self optimization according to an exemplary embodiment of the disclosure.

An exemplary embodiment may propose a simple, iterative and fair convergence rate signed graph approach enabling a near optimal solution for the optimization of the network. The self-optimization based on signed graph approach may be on par with the traditional approaches and may be implemented in any distributed system. Further, this approach may enable solving optimized power control for reducing TCP congestion and increasing rate.

In an exemplary embodiment, a signed graph G(V, E, τ) may be a directed graph, where V is set of nodes and E is the subset of Cartesian product of V×V and τ:E(i,j)→{+1,−1}. A signed graph may be a strongly connected graph (SCG), if there is a path between every pair of nodes. If there exists a path between any two nodes of a signed graph, path sign may be computed. A path sign of a path between two nodes may be the product of signs of sequential edges associated along the path between them. A signed graph may be balanced, if all the cycles of the graph have even number of negative signed edges. From a dynamic system perspective, parameters/variables of it may be represented as nodes. The interaction between parameters is represented by edges. The edges may be labeled as positive or negative, if a parameter activates or inhibits another parameter respectively. In this exemplary embodiment, any dynamic system that attains equilibrium may be bounded by several properties as follows:

The system attains the equilibrium in the process of converging to optimal solution if and if only if it is monotonic.

If a dynamic system represented by a signed graph is balanced, then it attains equilibrium.

If a graph is a SCG, then its adjacency matrix is irreducible.

If a dynamic system is irreducible, it is strongly monotonic.

A strongly monotonic system attains equilibrium.

Feasible optimal solutions exist, if and only if the corresponding signed graph of a dynamic system is balanced.

Referring to FIG. 2(b), an exemplary embodiment may propose one such method of signed-graph based self-optimization. This method may implement a multi time scale approach, in which the optimization involves sub-optimization at different time scales. In an exemplary embodiment, each of the nodes in the network may implement a self-optimization engine that is adapted to apply a signed-graph based self-optimization for enabling the optimization of the entire network. One such exemplary self-optimization engine (202) implemented on one of the node in the network is illustrated in FIG. 2(b). FIG. 2(b) illustrates sub-optimization at different time scales $T_1$, $T_2$ and $T_3$ respectively for node 'i'. The optimization at different scales is illustrated in FIG. 2(a).

In an exemplary embodiment, referring to FIG. 2(b), the influence between the variables or parameters may be represented as a Weighted Signed Graph (WSG). These parameters may include instantaneous power, modulation index, rate change, congestion window, and routing table etc. Each of the edges of the graph may be assigned a signed weight component having a real value: $\tau$: $E(i,j) \rightarrow \{x|x \in R\}$. Note that the WSG is generalization of signed graph. The notion of balancing, equilibrium, irreducibility, SCG, monotonic properties are also eligible for WSG. As illustrated in FIG. 2(b), the WSG proposed may have four different goal variables: $x_i$, $y_i$, $z_i$ and $\eta$ (rate of transmission—PHY layer capacity, Transport Layer transmission rate—congestion window in TCP, lifetime and overall throughput). These goal variables may be maximized in different time scales in $T_1$, $T_2$ and $T_3$ as shown in FIG. 2(b). Control variable $P_i$ (transmission power) may be updated at each node, whereas the other control variable $I_i$ (interference) may be updated by interference it receives from other nodes at a network level, i.e. by sensing various parameters from neighboring nodes in the network. Sensed parameters may include, without limitation, interference, routing table, congestion and combinations thereof. Further, referring to FIG. 2(b), goal variables may also be affected by the self-optimization engine (202) which controls the control variable along with the routing updates. In addition to this, present value of the goal and state variable of a node may also impact the goal and state variable of neighboring nodes (204).

In an exemplary embodiment, the self-optimization engine (202) at one of the individual nodes in the network (100) may enable solving the self-optimization problem by solving the equation (1) in a distributed manner. The self-optimization engine (202) may solve the problem by iteratively optimizing the individual parameters at the node until convergence is achieved. For example, consider $T_1$, $T_2$ and $T_3$ as the time scales for each node for each iteration that are varied dynamically such that $T_1 < T_2 < T_3$. The inputs to the optimization engine (202) may be $P_i$, $P_{MIN}$, $P_{MAX}$, $m_i$, $x_i \Delta p_i$, $\Delta y_i$, $\Delta z_i$ corresponding to current power, minimum, maximum power, current modulation index, current rate, delta power change, delta congestion window, delta battery power respectively. The $t_{i_1}$, $t_{i_2}$, $t_{i_3}$, $\delta T_1$, $\delta T_2$, $\delta T_3$ may be the current time scales and delta changes corresponding to three time scales as depicted in FIG. 2(a). At the end of time scale $T_1$, the instantaneous $P_i$, $m_i$ may be updated (by increasing or decreasing power and modulation index; one at a time till the goal variable saturates) such that ("s.t") $x_i$, $\eta$ are maximized. Further, after completing time scale $T_2$, the instantaneous $P_i$, $m_i$, $y_i$ may be updated, s.t $x_i$, $\eta$ are maximized. Finally the routing table based on lifetime of battery of node i may be updated s.t $\eta$ is maximized at the completion of time scale $T_3$ and also $t_{i_1}$, $t_{i_2}$, $t_{i_3}$ may be recomputed along with $P_i$, $m_i$, $y_i$. This process may be iteratively implemented till the convergence is achieved. In an exemplary embodiment, while updating of individual parameters, each edge interconnecting two parameters/nodes may be assigned a sign component based on updating value (increasing or decreasing). For example, if one of the parameter is updated and its current value is decreased, the edge facilitating the interconnection may be assigned a negative value and vice-versa. The generated signed-graph may be determined to be balanced if all the possible cycles of the graph have even number of negative signed edges.

Figure 3:
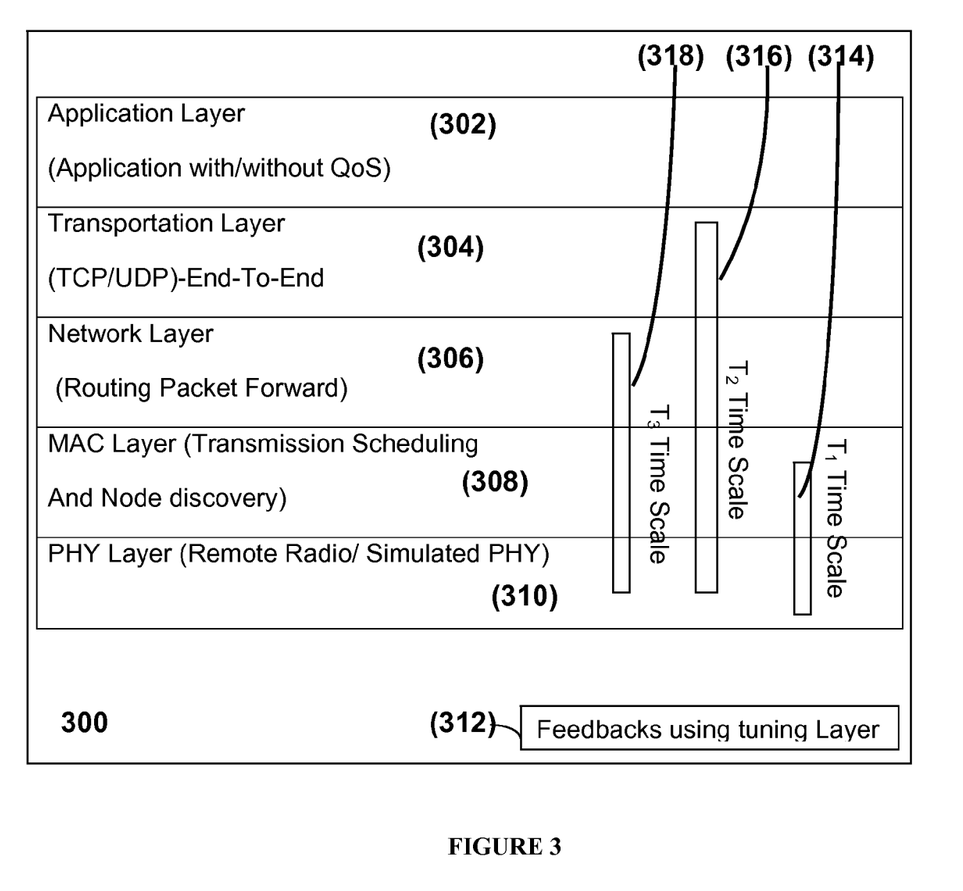
FIG. 3 illustrates a cross-layer framework (300) implementing inter-layer updates at multi-time scales according to an exemplary embodiment of the disclosure.

FIG. 3 illustrates a cross-layer framework (300) implementing inter-layer updates at multi-time scales according to an exemplary embodiment of the disclosure. In this exemplary embodiment, the self-optimization technique may be realized using cross-layer approach. As illustrated in FIG. 3, a TCP/IP protocol stack comprises a plurality of layers including an Application layer (302), a Transport Layer (304), a Network Layer (306), a Medium Access Control (MAC) Layer (308) and a Physical Layer (310). Exemplarily, the updating of individual parameters at different time scales due to self-optimization using signed-graph optimization may be communicated to individual layers involved in the self-optimization. The cross-layer based feedback architecture may require a tuning layer (312) in the form of a software patch that enables layer wise updates in the protocol stack. The tuning layer of Transport may update the MAC layer (308) and PHY layer (310) at timescale $T_2$ (316), that between Network layer and PHY/MAC layer at $T_3$ (318) and at $T_1$ (314) between PHY (310) and MAC (308) layers. Since all the layer information can be captured by the self-optimization engine (202) at each node, implementation of the proposed scheme may be made without many changes to the existing layered architecture.

Thus, the self-optimization engines implemented at each of the nodes may enable self-optimization of parameters at the nodes. This may enable self-optimization of the entire wireless network constituting the nodes. These nodes may not require message passing for providing optimal solution and hence may have battery saving and increased throughput for the network. Each node in the wireless network (100) as shown in FIG. 1 may comprise self-optimization engine like (202) shown in FIG. 2(b) that achieves self-optimization of the individual node parameters by applying the signed-graph approach. The self-optimization engine at various nodes in the network may enable solving of self-optimization problem identified in equation (1) by considering the problem as signed-graph problem and accordingly achieving the self-optimization till convergence is achieved.

Figure 4:
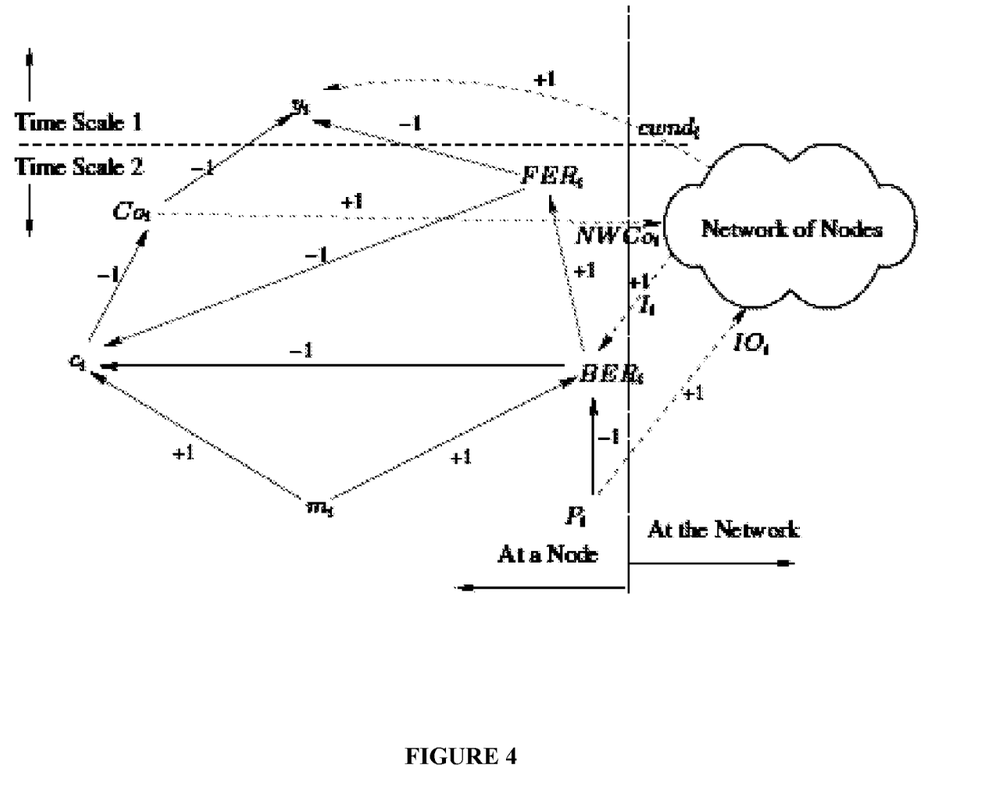
FIG. 4 illustrates a working example (400) of self-optimization enabling joint congestion and power control by generating a monotonic signed graph according to an exemplary embodiment of the disclosure.

FIG. 4 is a working example (400) of self-optimization enabling joint congestion and power control by generating a monotonic signed graph according to an exemplary embodiment of the disclosure.

In this exemplary embodiment, as illustrated in FIG. 4, the present disclosure is adapted to prove the suitability of the self-optimization using Monotonic Signed Graph (MSG) approach as a solution for Joint Optimal Congestion control and Power control (JOCP). A signed-graph based self-optimization approach may be deployed in each participating node of the network. The proposed approach may not require any message passing and may achieve maximum throughput and minimum power transmission, matching to that of the conventional optimal solution (JOCP). It may be observed that the rate of convergence of the proposed approach is within 4-5 Round Trip Times (RTTs). This approach may be widely utilized for implementing cross-layer congestion control in wireless ad-hoc networks, where long-flows are of importance. FIG. 4 illustrates the proposed monotonic signed graph of the system used for Joint Optimal Congestion control and Power control (JOCP). As illustrated in FIG. 4, the weights of each edge of the signed-graph in this proposal may be considered to be +1/−1. The experimental results by means of MATLAB simulation proves that the optimal solution for Joint Optimal Congestion control and Power control (JOCP) proposed by said Monotonic Signed Graph (MSG) approach is near to optimal solutions. However, the proposed approach may not require message passing and detail information for optimizing the congestion and power in the network and may thereby enhance the lifetime and throughput or transmission rate of individual nodes in the network.

FIGS. 5(a), 5(b), 6(a) and 6(b) collectively illustrate another working example of self-optimization for joint routing and lifetime maximization according to an exemplary embodiment of the disclosure.

According to this exemplary embodiment, a method and system of the present disclosure may be adapted to prove the suitability of self-optimization to achieve lifetime and throughput maximization of a wireless network by means of dynamic routing. In this example of self-optimization, the dynamic routing between the source and destination nodes may be computed such that the total cost between the source and the destination is minimized. Cost between the nodes may be functions of available battery power (lifetime) and congestion/usage of the link. FIG. 5(a) illustrates multiple paths and variable cost between the source and the destination.

Figure 5:
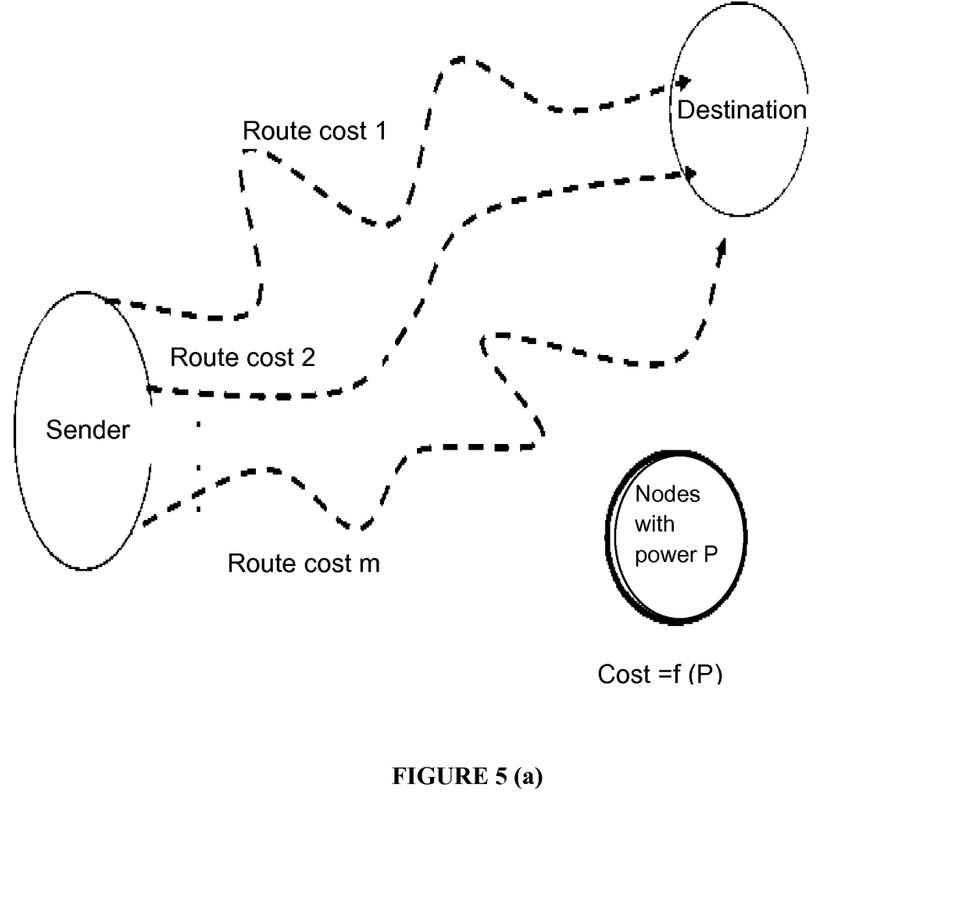
FIGS. 5(a), 5(b), 6(a) and 6(b) collectively illustrate another working example of self-optimization for joint routing and lifetime maximization according to an exemplary embodiment of the disclosure.

FIG. 5(b) illustrates an exemplary cost exchange mechanism used for enabling simulation of the proposed technique of self-optimization. For achieving this simulation, let the cost of a link be defined as the function of available battery power in the node associated with that particular link. For simplicity, the cost of a link may be defined as the reciprocal of available battery power in the node associated with that link. In this exemplary embodiment, when a node processes a packet, it may consume some power in the process of forwarding to the next node. This consumption of power may depend on the distance between the sender node and receiver node. When a node has less remaining battery power then the probability of node failure may increase. The routing metric in this approach shall be the cost depending upon available battery power and battery power changes every time when there is packet transmission in the network. It may require dynamic routing in which the cost of the link between two nodes is used as the metric for routing computation. In this approach, a route having minimum cost may be used to transmit a packet. Hence, nodes having less remaining battery power may be avoided for transmission and therefore may not be depleted. Each node may maintain a table providing the least known cost in terms of battery capacity for each destination and the link to arrive the destination node. A node knows its battery power information and it may calculates its cost according to defined function and advertises power information to its neighbors using the normal routing broadcasts. The cost-exchange mechanism implemented for simulation is illustrated in FIG. 5 (b).

Figure 6:
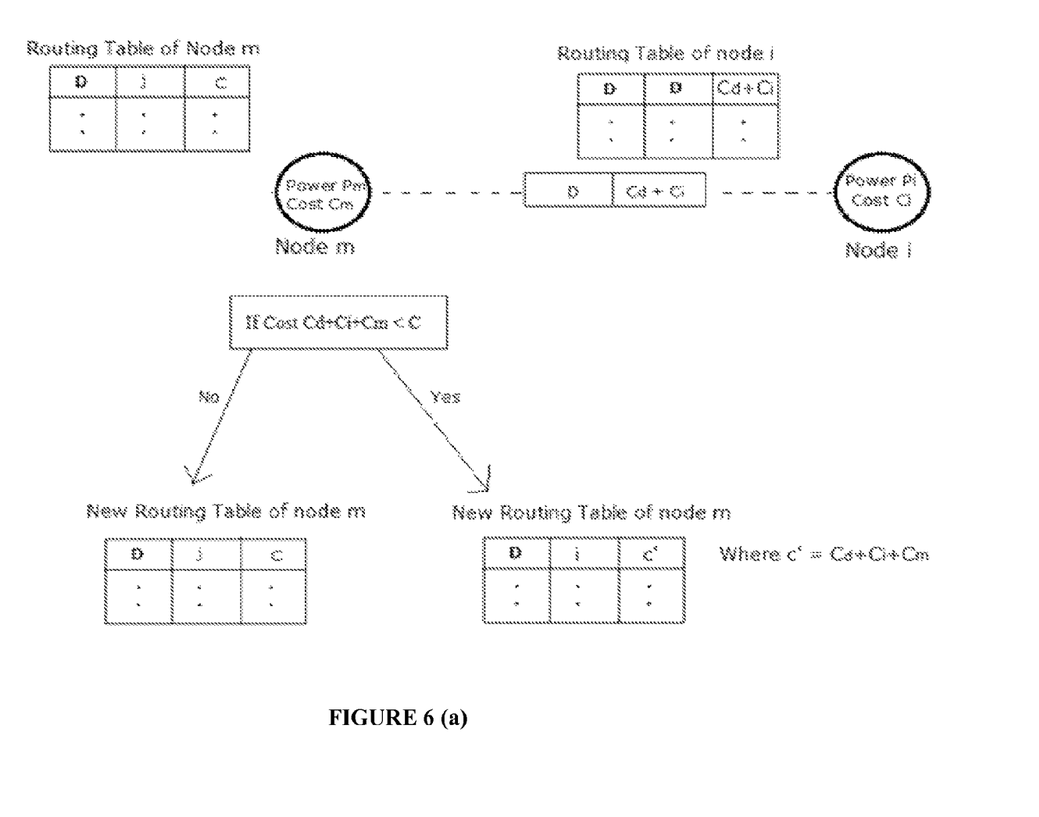

FIG. 6 (a) and FIG. 6 (b) illustrate a dynamic route update scheme and non-uniform power division scheme according to an exemplary embodiment of the disclosure.

In an exemplary embodiment, routing update at a particular node 'm' is illustrated in FIG. 6 (a). Node 'm' may already contain routing information about destination node D and may receive a broadcast message from node " " In this exemplary embodiment, node 'm' may be adapted to compute its new cost and check the existing cost. Node 'm' may then replace the route only if the new cost is less than the existing cost. Further, node 'm' may be configured to forward newly updated information to its neighboring nodes. If the new cost is higher than the older cost, node 'm' may be enabled to discard newly arrived information message and hence may not forward any information to the neighboring nodes. In this embodiment, when node m's battery power reaches to the threshold level (minimum power level), it may not send information to any other node and hence neighboring nodes may not receive any information message from ode 'm' anymore. These nodes may assume that node 'm' is power depleted and link is broken and packets can't be delivered through that node. Nodes may update their tables with new entries when there is a change in the battery power of any node. Since broadcast messages also impact the lifetime of the network, instead of regular update for every data packet transmission, this approach may broadcast update messages only when there is a change in the power level of a node. For this, non-uniform division of the battery power available may be defined at a node for power threshold computation and updating. This is illustrated in FIG. 6 (b). Battery powers in same section/range may have same cost and the cost function may be modified as inverse battery power of the threshold value of the section. A battery power that is in higher levels will be having less cost than a battery power that is in lower levels. In this embodiment, the battery cost function may increase/decrease in discrete steps instead of continuous increase/decrease as battery power decreases/increases.

In an exemplary embodiment, the proposed method of multi-time scale, self-optimization enabling enhancement in lifetime and throughput may be implemented for landslide detection using wireless sensor network.

In general, wireless sensors in the wireless sensor network may be deployed in the landslide prone area in a planned or un-planned (sensors can be dropped randomly) manner. In most of the cases, deployment of such sensors may not be possible in a planned manner. Therefore, for accurate sensing, more and more sensors may need to be deployed in the target area. Along with accuracy, the life time, efficient transmission and self-maintainability of these sensors may also be important.

However, deployment of such sensors and effective use of them is quite challenging. For example, the deployed land can be of millions of hectares and can be of difficult terrain (such as hills, jungles, river beds, etc.). It is difficult not only to access (physically) the wireless sensors of this network in these areas, but also to manage such kind of networks. Also, deploying the sensors and replacing old sensors periodically or frequently in un-accessible terrains like hills, river beds, jungles, etc. may not be practically viable. Therefore, these sensors should work for a longer lifetime by optimally using battery power available with them. In addition, these nodes need to be reliable in terms of accurate information and quick information sources. Any delay in sensing and communicating may cost human life and other loss.

In this embodiment, the proposed method of multi-time scale, self-optimization may be utilized to obtain the dynamic routes between the sensor node and the central location, such that lifetime of the network (hence the lifetime of the nodes) is maximized. By the use of this technique, sensor nodes may be utilized for a longer period without replacement and landslide can be detected for a prolonged period.

The above described exemplary embodiments may enable enhancement of throughput and lifetime of a distributed wireless network by self-optimizing the network. They may further enable the individual nodes to sense the parameters of the neighboring nodes in the distributed wireless network using a self-learning mechanism. They may further enable generating a signed-graph to perform self-optimization using parameters of the individual nodes and the sensed parameters of the neighboring nodes. They may also allow using parameters of the individual nodes at different time scales until a convergence is achieved in the network. They may also allow implementing a cross-layer based approach to facilitate inter-layer updates amongst the individual protocol layers due to self-optimization of the parameters at the individual nodes of the network.

Exemplary embodiments discussed above may provide certain advantages. Though not required to practice aspects of the disclosure, these advantages may include:

1. Lifetime and throughput maximization in the wireless networks. 2. Enabling self-optimization based practical implementable solutions closely matching optimal solutions in the art.

3. Proposed techniques may be less complex, easy to deploy and may not require any additional infrastructure cost.

4. The disclosed techniques may not require message passing with the nodes and therefore may be scalable with judicious utilization of resources.

5. The techniques may not require detailed information about the node placement, power available, detailed QoS requirement, etc during optimization of the wireless networks.

6. Enabling power saving at each node in the network during optimization of the network.

According to exemplary embodiments, each of the nodes in the network enabling self-optimization of the network can be a machine or other computing device within which a set of instructions, when executed, may cause the machine to perform any one or more of the methodologies discussed above. The machine may comprise a small wireless node/sensor, a server computer, a client user computer, a personal computer (PC), a tablet PC, a laptop computer, a desktop computer, or any machine capable of executing a set of instructions (sequential or otherwise) that specify actions to be taken by that machine. Further, while a single machine is illustrated, the term "machine" shall also be taken to include any collection of machines that individually or jointly execute a set (or multiple sets) of instructions to perform any one or more of the methodologies discussed herein.

The machine may include a self-optimization engine (for example, self-optimization engine 202), a processor (e.g., a central processing unit (CPU)), and a memory which communicates with each other via a bus. In some exemplary embodiments, the processor may implement the self-optimization engine 202. The memory may store instructions that when executed cause the processor of the machine to adapt the self-optimization engine to perform any one or more of the methodologies discussed above.

It will be apparent to those skilled in the art that various modifications and variations can be made to the disclosed methods and systems. Other embodiments will be apparent to those skilled in the art from consideration of the specification and practice of the disclosed methods and systems. It is intended that the specification and examples be considered as exemplary only, with a true scope being indicated by the following claims and their equivalents.

What is claimed is:

1. A computer-implemented method for enhancing throughput and lifetime of a wireless distributed communication network, the method comprising:

sensing, by a first machine, different parameters of at least one neighboring machine; updating, by the first machine, at least one parameter of said first machine based on said sensed parameters of said at least one neighboring machine;

generating, by the first machine, a signed-graph on the basis of the updated at least one parameter, wherein said generated signed-graph comprises at least two nodes representing said updated at least one parameter and at least one edge interconnecting said at least two nodes;

iteratively updating, by the first machine, the at least one parameter at different time-scales until convergence is achieved; and communicating, by the first machine, inter-layer updates in individual layers of a transmission protocol stack of the first machine due to said iteratively updated at least one parameter.

2. The method of claim 1, wherein said sensed parameters includes at least one interference, routing table, and congestion.

3. The method of claim 2, where said parameters are sensed from periodic broadcasts and through packet acknowledgments in the network.

4. The method of claim 1, wherein said updated at least one parameter of the first machine includes at least one of instantaneous power, modulation index, rate change, congestion window, and routing table.

5. The method of claim 1, wherein said inter-layer communication takes place by implementing a cross-layer approach in the protocol stack that updates the individual layers pertaining to the updated at least one parameter on the first machine.

6. The method of claim 1, wherein said at least one edge represents an interaction between said at least two interconnected nodes.

7. The method of claim 1, wherein said at least one edge in the generated graph is assigned a signed weight component on the basis of increasing or decreasing of the updating parameter from a previous value.

8. The method of claim 1, wherein said generated signed-graph is balanced if all the possible cycles of the generated signed-graph have even number of negative signed edges.

9. The method of claim 1, wherein said wireless distributed communication network includes a plurality of sensor machines deployed together for monitoring applications.

10. A system for enhancing throughput and lifetime of a distributed wireless communication network, the system comprising:

a plurality of machines connected in the network, each of the machines including a self-optimization engine implemented by a processor coupled to a memory, said memory storing instructions which when executed by a-said processor adapt said self-optimization engine to:

sense different parameters of at least one neighboring machine;

update at least one parameter of said at least one neighboring machine;

generate a signed-graph on the basis of the updated at least one parameter of the at least one neighboring machine, wherein said generated signed-graph comprises at least two nodes representing said updated at least one parameter and at least one edge interconnecting said at least two nodes;

iteratively update the at least one parameter of the at least one neighboring machine at different time-scales until convergence is achieved; and communicate inter-layer updates in individual layers of transmission protocol stack of the at least one neighboring machine.

11. The system of claim 10, wherein said inter-layer communication takes place by implementing a cross-layer approach in the protocol stack that updates the individual layers pertaining to the updated at least one parameter on the at least one neighboring machine.

12. The system of claim 11, wherein said implemented cross-layer approach adopts a tuning layer software patch that enables the updates amongst the protocol layers of the at least one neighboring machine.

13. The system of claim 10, wherein said at least one edge in the generated signed-graph is assigned a signed weight component on the basis of increasing or decreasing of the updated at least one parameter from a previous value.

14. The system of claim 10, wherein said generated signed-graph is balanced if all the possible cycles of the generated signed-graph have even number of negative signed edges.

15. The system of claim 10, wherein said distributed wireless communication network includes a plurality of sensor machines deployed together for monitoring applications.

* * * * *